United States Patent
Ben Hamida et al.

(10) Patent No.: US 11,973,635 B2
(45) Date of Patent: Apr. 30, 2024

(54) METHOD AND SYSTEM FOR DETECTING INCIDENTS IN AT LEAST ONE LOCAL AREA COMMUNICATION NETWORK

(71) Applicant: SAGEMCOM BROADBAND SAS, Rueil Malmaison (FR)

(72) Inventors: Elyes Ben Hamida, Rueil Malmaison (FR); Maxime Parolini, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 203 days.

(21) Appl. No.: 17/541,832

(22) Filed: Dec. 3, 2021

(65) Prior Publication Data

US 2022/0182280 A1    Jun. 9, 2022

(30) Foreign Application Priority Data

Dec. 9, 2020  (FR) ...................... 2012908

(51) Int. Cl.
*H04L 41/04* (2022.01)
*H04L 41/0654* (2022.01)
*H04L 41/069* (2022.01)

(52) U.S. Cl.
CPC ........ *H04L 41/0654* (2013.01); *H04L 41/069* (2013.01)

(58) Field of Classification Search
CPC ............... H04L 41/0654; H04L 41/069; H04L 43/0811; H04L 43/12; H04L 41/064
See application file for complete search history.

(56) References Cited

U.S. PATENT DOCUMENTS

| | | | |
|---|---|---|---|
| 6,405,250 B1 * | 6/2002 | Lin | H04L 41/046 709/224 |
| 9,652,972 B1 * | 5/2017 | Lobo | H04L 41/0618 |
| 10,812,317 B1 * | 10/2020 | Kurtz | H04L 41/147 |
| 2010/0027432 A1 | 2/2010 | Gopalan et al. | |
| 2010/0274616 A1 | 10/2010 | Grace et al. | |
| 2015/0341239 A1 * | 11/2015 | Bertran Ortiz | H04L 43/08 709/224 |
| 2017/0236071 A1 * | 8/2017 | Walker | G08B 21/187 706/11 |
| 2020/0218802 A1 * | 7/2020 | Davis | G06F 21/554 |
| 2020/0267057 A1 | 8/2020 | Garvey et al. | |

OTHER PUBLICATIONS

Jul. 1, 2021 Search Report issued in French Patent Application No. 2012908.

* cited by examiner

*Primary Examiner* — Steven Hieu D Nguyen
(74) *Attorney, Agent, or Firm* — Williams Mullen; R. Brian Drozd

(57) ABSTRACT

A method and a device for detecting incidents in a local area network by way of an incident detection device, the incident detection device being connected to the local area network via a wide area network, a data collection agent collecting data describing the local area network. The device is able to detect various types of anomaly and receives messages from the collection agent, validates and aggregates data contained in each received message into groups of data, calculates a severity score for each group of data, for each type of anomaly and calculates a total severity score for each group of data, calculates a total criticality score from all of the total severity scores, and generates recommendation messages or corrective actions at least on the basis of the total criticality score.

13 Claims, 4 Drawing Sheets

METHOD AND SYSTEM FOR DETECTING INCIDENTS IN AT LEAST ONE LOCAL AREA COMMUNICATION NETWORK

TECHNICAL FIELD

Prior Art

Local area networks, originally set up mainly on company premises, have expanded very significantly into homes. These local area networks, whether wired and/or wireless, allow users to access services offered by wide area networks, such as for example the Internet. The services are for example offered by Internet access providers, who furthermore supply at least some of the various elements that make it possible to form the local area network.

When an incident occurs in a local area network, the users of this local area network call upon the technical services of the operator to resolve the incident. To set themselves apart and capture more value in this highly competitive market, Internet access providers have to offer the best at-home digital experience by being capable of rapidly diagnosing an incident and being able to resolve said incident as quickly as possible.

Remote diagnosis and resolution of an incident offer this speed.

DISCLOSURE OF THE INVENTION

To this end, according to a first aspect, the invention provides a method for detecting incidents in a local area network by way of an incident detection device, the incident detection device being connected to the local area network via a wide area network, the local area network comprising a data collection agent collecting data describing the connections between stations and nodes of the local area network and data describing the connections between the nodes, characterized in that the incident detection device is able to detect various types of anomaly and in that the method comprises the following steps, performed by the incident detection device:
  receiving messages from the collection agent, validating and aggregating data characteristic of links of the local area network and contained in each received message into groups of data,
  calculating a severity score for each group of data, for each type of anomaly and calculating a total severity score for each group of data,
  calculating a total criticality score from all of the total severity scores for the aggregated groups of data during a predetermined duration, the predetermined duration being such that a plurality of groups of data are aggregated during the predetermined duration,
  generating recommendation messages or corrective actions at least on the basis of the total criticality score.

The invention also relates to a device for detecting incidents in a local area network, the incident detection device being connected to the local area network via a wide area network, the local area network comprising a data collection agent collecting data describing the connections between stations and nodes of the local area network and data describing the connections between the nodes, characterized in that the incident detection device is able to detect various types of anomaly and in that the incident detection device comprises:
  means for receiving messages from the collection agent, validating and aggregating data characteristic of links of the local area network and contained in each received message into groups of data,
  means for calculating a severity score for each group of data, for each type of anomaly and calculating a total severity score for each group of data,
  means for calculating a total criticality score from all of the total severity scores for the aggregated groups of data during a predetermined duration, the predetermined duration being such that a plurality of groups of data are aggregated during the predetermined duration,
  means for generating recommendation messages or corrective actions at least on the basis of the total criticality score.

The present invention thus makes it possible to quickly diagnose an incident and to be able to resolve said incident as quickly as possible and remotely.

According to one particular embodiment of the invention, the method furthermore comprises a step of calculating the average of the total severity scores weighted by the duration of the groups of data so as to obtain a health score for the local area network.

According to one particular embodiment of the invention, the recommendations or corrective actions are also generated on the basis of the total health score.

According to one particular embodiment of the invention, the local area network consists of elements and severity scores, total severity scores, total criticality scores and health scores are calculated for at least some of the elements of the local area network.

According to one particular embodiment of the invention, the recommendations or corrective actions are also generated on the basis of the scores calculated for the at least one portion of the local area network.

According to one particular embodiment of the invention, the data are aggregated by partitioning the data with a predetermined periodicity, if, within a partition, no change of operating feature of a link occurs, a group of data is formed, the group of data comprising all of the data of the partition and, within each partition, upon each change of at least one operating feature of a link, a group of data is formed, which comprises the data of the partition corresponding to the operating feature of the link.

According to one particular embodiment of the invention, the operating feature of the link is a frequency band, a channel or a communication protocol.

According to one particular embodiment of the invention, the value of the severity score is bounded by the value 0 and the value 1.

The present invention thus makes it possible to easily combine various severity scores.

According to one particular embodiment of the invention, each total severity score is bounded by the value 0 and the value 1 and is equal to the value 1 as soon as a severity score is equal to 1.

The total severity score thus reflects a severe anomaly.

According to one particular embodiment of the invention, each total criticality score is calculated on the basis of the sum of the total severity scores weighted by the duration of the groups of data.

According to one particular embodiment of the invention, the recommendations are suggestions to move a station closer to a node of the local area network or to add a node to the local area network or to move a node of the local area network or to modify a channel to be used or to modify local algorithm thresholds that cause channel changes or to remove noise sources or to restore a configuration of the communication protocol, and the corrective actions are channel modifications or modifications of local algorithm thresholds that cause channel changes.

The present invention also relates to a computer program product. It comprises instructions for a node device to implement the method according to one of the previous embodiments when said program is executed by a processor of the node device.

The present invention also relates to a storage medium. It stores a computer program comprising instructions for a node device to implement the method according to one of the previous embodiments when said program is executed by a processor of the node device.

BRIEF DESCRIPTION OF THE DRAWINGS

The abovementioned features of the invention, along with others, will become more clearly apparent upon reading the following description of one exemplary embodiment, said description being given with reference to the appended drawings, in which.

DETAILED DESCRIPTION OF EMBODIMENTS

Figure 1:
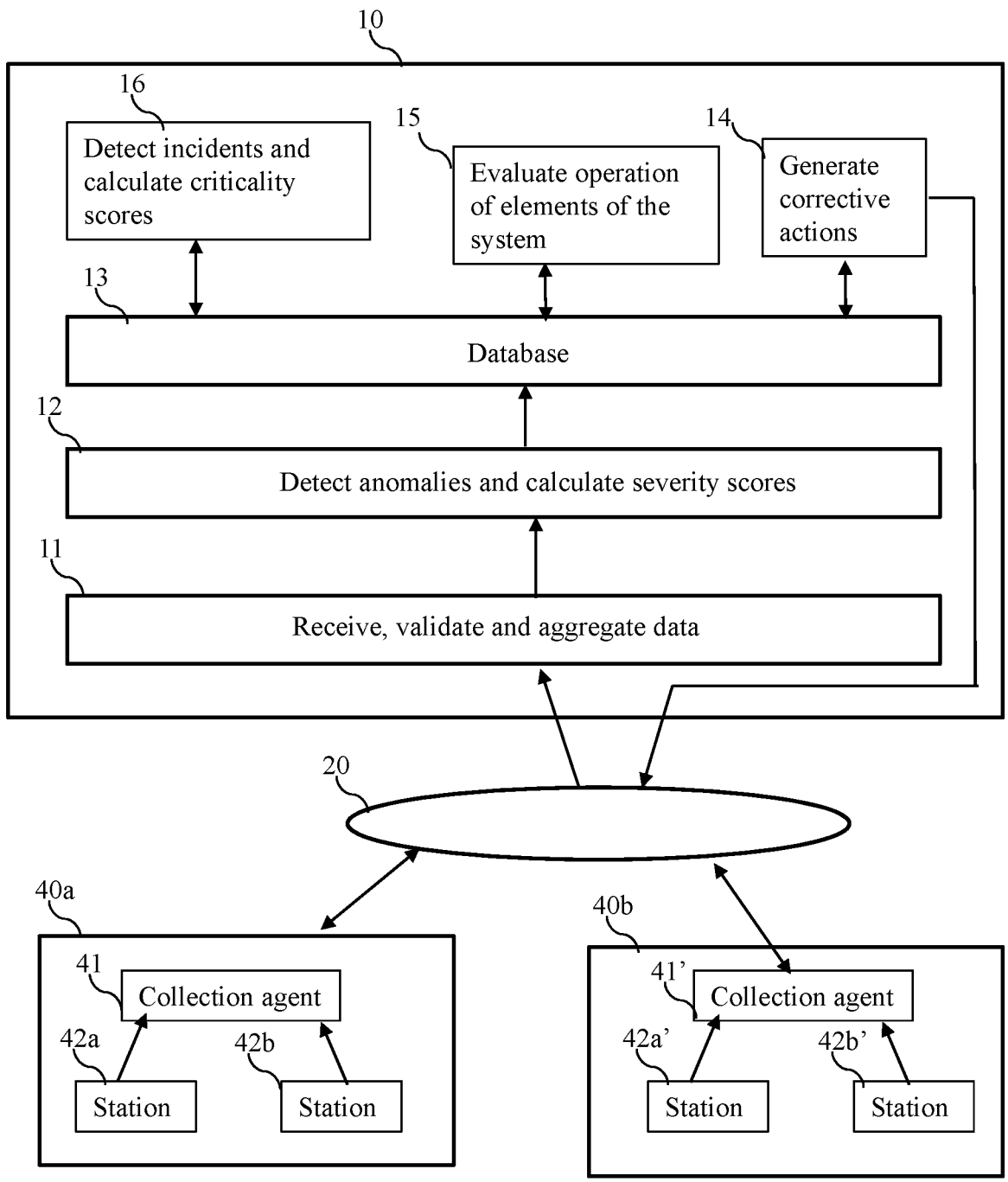
FIG. 1 schematically illustrates a telecommunications system in which the present invention is implemented.

FIG. 1 schematically illustrates a telecommunications system in which the present invention is implemented.

In FIG. 1, an incident detection device 10 is connected to local area networks 40 (LAN) via a wide area network 20.

For example, the local area networks 40 are wired and/or wireless home networks. Only two home networks 40a and 40b are shown in FIG. 1 for the sake of simplicity. In one particular example, the local area networks 40a and 40b are Wi-Fi wireless networks.

In the example of FIG. 1, a single incident detection device 10 is shown. The incident detection device is in a computing cloud, or cloud. The various elements forming the incident detection device 10 may be distributed among various computing devices contained in the computing cloud.

The wide area network 20 is for example an Internet network.

In the example of FIG. 1, the local area network 40a comprises two stations 42a, 42b and an access point or node connected to the wide area network, which acts as data collection agent 41 in the local area network 40a. The local area network 40b comprises two stations 42a', 42b' and an access point connected to the wide area network, which acts as data collection agent 41' in the local area network 40b.

The access points are for example gateways between the wide area network 20 and the local area networks 40a or 40b.

It should be noted here that each node is able to collect data in the local area network 40.

The setup of the access point and the stations in a home may generate incidents, such as the size, the make-up of the home, and the number of stations.

Likewise, in a Wi-Fi wireless local area network, interference with adjacent networks or devices emitting radio waves in the same frequency band may occur.

The use of multiple services, such as streaming, home automation, TV over Internet, online gaming, Internet of Things, etc. in one and the same local area network may also interfere with some of these services.

The or each collection agent obtains data describing the connections between stations and nodes of the local area network and data describing the connections between the nodes, linked to the quality and the use of the local area network. These data are collected at regular intervals and are stored locally in each node. These data are then sent, at regular intervals, by each node, to the collection agent, which groups said data into a single message that is transmitted to the incident detection device 10 via the wide area network.

As a variant, the data may be collected at a central node, such as an Internet gateway comprising the collection agent, grouped into a single message that is sent to the incident detection device 10.

The data that are collected are for example, but without limitation, the list of nodes of the local area network and their function, for example Internet gateway, Wi-Fi repeater, set-top box, along with their descriptive data, for example software version, IP address, MAC address, Wi-Fi standard(s) supported, Wi-Fi band used.

The data that are collected are for example, but without limitation, the list of connections or links between the stations and the nodes, the list of connections between the nodes, along with their descriptive data, for example a timestamp, a signal power or RSSI (acronym for received signal strength indicator), a noise level, a volume of bytes sent and/or received, use of one or more radio channels, frequency band, number of packets transmitted and/or received and/or lost and/or retransmitted.

Other metrics representative of nominal operation of each of the items of equipment, such as the nodes or the stations in the local area network, may also be contemplated. These items of equipment may moreover be connected via Wi-Fi wireless technology, but also a Bluetooth technology, or a wired access technology such as Ethernet or through power line communication. In one example, a metric representative of the power consumption of an item of equipment may be collected. In another example, a 10 Mbps/100 Mbps/1000 Mbps Ethernet link speed metric may also be collected.

The data that are collected are aggregated into a message and are sent for example in a JSON (acronym for JavaScript Object Notation) format using a communication protocol, such as for example the HTTP (HyperText Transfer Protocol) or MQTT (Message Queuing Telemetry Transport) protocol.

It should be noted here that, as a variant, the message is sent at predetermined times and/or upon demand of the incident detection device 10.

The incident detection device 10 comprises a data reception, validation and aggregation module 11, which receives and processes each received message.

The data reception, validation and aggregation module 11 validates the content of each received message, for example by checking whether the format of the received message is consistent, whether the values of the information contained in the received message are within a consistent value range, and whether the local area network from which the message originated forms part of the set of local area networks managed by the incident detection device 10.

In the affirmative, the data reception, validation and aggregation module 11 aggregates the data describing the connections between the stations and the nodes and the data describing the connections between the nodes into groups of data.

For example, the data are partitioned with a predetermined periodicity, for example equal to 10 minutes.

If, within a partition, no change of operating feature of a link occurs, a group of data is formed, the group of data comprising all of the data of the partition.

Within each partition, upon each change of at least one operating feature of a link, a group of data is formed, which comprises the data of the partition corresponding to the frequency band, to the channel and to the communication protocol.

An operating feature of a link is for example, and without limitation, the frequency band, the channel and the communication protocol, such as for example the Wi-Fi protocol.

More specifically, a group of data comprises data, during a duration of 10 minutes, obtained for the frequency band and the channel and the communication protocol that are used during said predetermined period. A group of data comprises, during a duration of use of the same frequency band, of the same channel and of the same communication protocol used, the data obtained for the frequency band and the channel and the communication protocol that are used.

Figure 3:
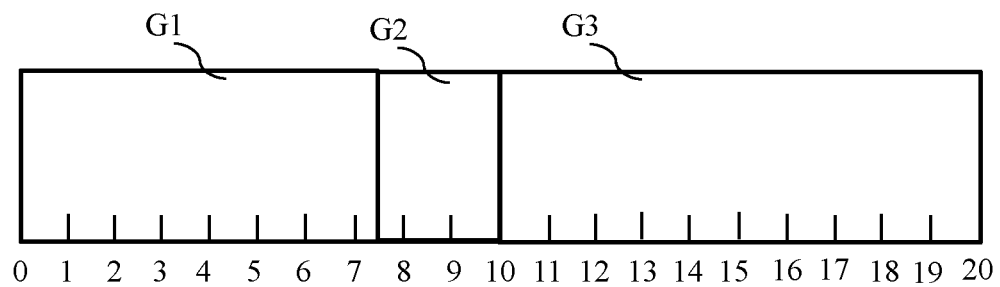
FIG. 3 schematically illustrates one example of data aggregation according to the present invention.

One example of aggregation is given with reference to FIG. 3.

FIG. 3 schematically illustrates one example of data aggregation according to the present invention.

In the example of FIG. 3, the data received during the first ten minutes, denoted 0 to 9, are not obtained for the same frequency band, for the same channel and for the same communication protocol used, and two groups denoted G1 and G2 are formed.

Group G1 comprises the data obtained on the 2.4 GHz frequency band, channel 1 and the 802.11g protocol. Group G2 comprises the data obtained on the 2.4 GHz frequency band, channel 6 and the 802.11g protocol.

The data received during the following ten minutes, denoted 10 to 19, are obtained for the same frequency band, for the same channel and for the same communication protocol used.

Group G3 is formed.

Group G3 comprises the data obtained on the 2.4 GHz frequency band, channel 6 and the 802.11g protocol.

The groups are thus used to smooth the data sent by the nodes by aggregating them. For each group of data, the variation in the counters for counting volumes of bytes and packets within the group, along with the minimum, the maximum and the average of a certain number of metrics, such as for example RSSI, noise, etc., are calculated.

The incident detection device 10 comprises an anomaly detection and severity score calculation module 12.

The anomaly detection and severity score calculation module 12, for each group of data and each type of anomaly, calculates a score bounded between 0 and 1, called severity score, for the various metrics.

The severity score makes it possible to evaluate the difference between these metrics and predetermined values representative of normal operation or behaviour.

A severity score of 0 signifies that there is no anomaly, and a severity score of 1 signifies significant interference on the Wi-Fi link for the group.

For example, the severity score for the "Wi-Fi coverage" anomaly has a value of 0 for an RSSI greater than or equal to −60 dBm, and increases linearly up to 1 for an RSSI of −80 dBm and beyond.

Specifically, an RSSI level of −60 dBm may be representative of a good signal reception quality for one of the stations whose RSSI-related data are incorporated into one of the groups. A perceived RSSI level of −80 dBm is representative of noisy signal reception in comparison with a level of −60 dBm, this possibly leading to or denoting a worsening of the transmissions within the local area network 40.

For example, the severity score for the "noise level" anomaly for a node has a value of 0 for noise less than or equal to −80 dBm, and increases linearly up to 1 for a noise of −60 dBm and beyond.

For example, the severity score for the "channel change" anomaly for a node has a value of 0 for a number of channel changes less than or equal to 2, and increases linearly up to 1 for a number of channel changes greater than or equal to 5 during a time period equal to 30 minutes.

For example, the severity score for the "node change" anomaly for a station has a value of 0 for a number of node changes less than or equal to 2, and increases linearly up to 1 for a number of node changes greater than or equal to 5 during a time period equal to 30 minutes.

In the above examples, the respective severity scores are obtained through a linear increase or interpolation, having the advantage of ease of calculation for a large volume of data, and the severity score comparisons are thus made easier.

In other examples, the respective severity scores are obtained in accordance with other calculating methods or modes. For example, the severity score for the "Wi-Fi coverage" anomaly is obtained from a lookup table in which a score is assigned for certain RSSI values or certain RSSI value ranges.

This table may be obtained for example by defining RSSI ranges of 3 dBm, representative of a perceived signal level divided by 2: the score 0 is assigned to the range [−60 dBm; −63 dBm[, the score 0.25 is assigned to the range [−63 dBm; −66 dBm[, the score 0.5 is assigned to the range [−66 dBm; −69 dBm[, the score 0.75 is assigned to the range [−69 dBm; −72 dBm[, and the score 0.99 is assigned to the range [−72 dBm; −80 dBm]. In this last range, the severity score of 0.99 for Wi-Fi coverage whose RSSI is contained within this range indicates that the reception level is too noisy for the transmissions sent to or received from the station to be effective.

Severity scores are calculated for each element of the local area network.

The anomaly detection and severity score calculation module 12 thus calculates, for each group of data, a severity score for each type of anomaly.

The anomaly detection and severity score calculation module 12 also calculates severity scores for one or more elements of the local area network considering only the data relating to the element of the local area network.

The anomaly detection and severity score calculation module 12 calculates, for each group of data, a total severity score on the basis of the severity scores calculated for the group of data. Laws for composing the scores are defined for this purpose:

A first addition law: $s_1 \oplus s_2 = f_+(S_1 + S_2)$

Where $$S_1 = f_-(s_1),$$

$$S_2 = f_-(s_2),$$

$$f_+(x) = \frac{x}{1+x},$$

$$f_-(x) = \frac{x}{1-x}$$

and $\oplus$ is the direct sum operator.

where $s_1$ is for example the severity score for the "Wi-Fi coverage" anomaly and $s_2$ is for example the severity score for the "volume of bytes" anomaly.

A second multiplication law $m*s=f_+(mS)$, where $S=f_-(s)$ and $m \in [0, \infty[$.

The total severity score s', is given by $\oplus_{i=1}^{n} s_i$, where n is the number of anomalies and $s_i$ is the severity score for the anomaly of the type indexed by the index i.

The set [0; 1[ and the laws ($\oplus$,*) have most of the properties of a body structure, except that the law $\oplus$ is not reversible. The functions $f_-$ and $f_+$ then perform homeomorphisms respectively to and from ($\mathbb{R}$, +, x), guaranteeing the following properties:

$$0*s=0$$

$$1*s=1$$

$$m*1=1$$

$$f_-(m*s)=m \times f_-(s)$$

$$s \oplus s = 2*s$$

$$m_1*(m_2*s)=(m_1*m_2)*s$$

$$m*(s_1 \oplus s_2)=(m*s_1) \oplus (m*s_2)$$

$$s_1 \oplus s_2 = s_2 \oplus s_1$$

$$s_1 \oplus (s_2 \oplus s_3)=(s_2 \oplus s_1) \oplus s_3$$

This total severity score is also between 0 and 1, increases with the other severity scores, and is equal to one as soon as one of the severity scores is equal to one.

The anomaly detection and severity score calculation module 12 also calculates total severity scores for one or more elements of the local area network considering only the data relating to the element of the local area network.

Each severity score and total severity score is stored in a database 13.

The incident detection device 10 comprises a module 15 for evaluating the operation of the elements of the local area network.

The module 15 for evaluating the operation of the elements of the local area network calculates at least one indicator of the health of the local area network and/or calculates a health score respectively for one or more elements over a day. An element is for example and without limitation a node, a link, etc.

The aim of the health indicator is to construct a bounded score in order to be able to compare various local area networks and/or various elements or various time ranges without scale considerations: the health of a large network does not have to be penalized by its size; it is normal to find more anomalies there than in a small network.

The module 15 for evaluating the operation of the elements of the local area network advantageously uses the total severity score for a group to calculate an indicator representative of the health of an element, taking the 1's complement of the total anomaly score. For a set of groups, the module 15 for evaluating the operation of the elements of the local area network calculates the average of the health scores weighted by the duration of the groups.

A health score may be assigned to any set of groups of data: a local area network over a day. This health score is bounded between 0 and 1, and may therefore be transformed to any health indicator scale (for example percentage, index between 1 and 5, etc.).

The health score is calculated using the following formula:

$$H = 1 - \frac{\sum_{liens} t_i \times s'_i}{\sum_{liens} t_i}$$

where $t_i$ is the connection duration of the group i and $s'_i$ is the total severity score for the group of data.

The module 15 for evaluating the operation of the elements of the local area network also calculates health scores for one or more elements of the local area network considering only the total severity scores relating to the element of the local area network.

The health score makes it possible to visually represent/summarize the health level of a local area network and to be able to compare it with other local area networks. It is for example used by the operator responsible for analysing performance and the health level of local area networks on the scale of a fleet of subscribers.

The health scores calculated for elements of the local area network make it possible to visually represent/summarize the health level of an element of the local area network and to be able to compare it with other elements of the local area network and/or with elements of other local area networks.

The data calculated by the module 15 for evaluating the operation of the elements of the local area network are stored in the database 13.

The incident detection device 10 comprises an incident detection and criticality score calculation module 16.

The incident detection and criticality score calculation module 16 performs daily analysis in order to detect incidents on the local area network and to offer appropriate recommendations. An incident, in contrast to anomalies, takes place on the scale of a day. Depending on the type of incident, this may concern a station, for example linked to the station using an outdated standard, a Wi-Fi link, for example incorrect packet transmission, or an access point, for example a high noise level.

Each type of incident is linked to a type of anomaly. To determine whether there is an incident, the incident detection and criticality score calculation module 16 calculates, for all of the groups in question, the connection duration weighted by the associated total severity. This criticality score, which is expressed in seconds, is called total criticality score:

$$c = \sum_{groupes} t_i \times s'_i$$

where $t_i$ is the connection duration of the group i, $s'_i$ is the total severity score for the anomaly and the summing is performed on all of the groups of data affected by the incident.

An incident thus makes it possible to see whether the criticality linked to an anomaly is problematic over a day: this incident is spread out over time with a non-zero severity. It is considered that there is effectively an incident if the calculated criticality score exceeds a reference duration, for example 600 seconds, that is to say 10 minutes of anomaly with maximum severity.

Figure 4:
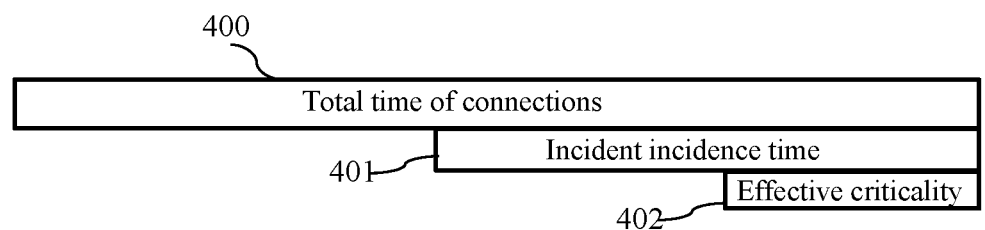
FIG. 4 illustrates the principle of calculating the criticality of an incident by way of an incident detection module and of calculating criticality scores.

The total criticality is the preferred metric for measuring the impact of an incident on the local area network. The most serious incidents are those that impact the most links of the local area network for the longest time to the severest extent. It is sometimes beneficial to consider the incidence time instead, that is to say the cumulative duration of all of the groups affected by the incident. By construction, the total criticality 402 is less than or equal to the incidence time 401, which is itself less than the total connection time over the day 400, as illustrated in FIG. 4.

For example, if the total criticality score is greater than 40% of the total duration of the connections, corrective actions may be performed depending on the type of incident. If the user has been impacted for more than 4 hours out of a total of 10 hours of connections, the incident is for example considered to be relatively serious, and corrective actions may be performed.

The incident detection and criticality score calculation module 16 also calculates total criticality scores for one or more elements of the local area network considering only the total severity scores relating to the element of the local area network.

The incident detection device 10 comprises a corrective action generation module 14. The corrective action generation module 14 generates recommendations or corrective actions for improving the operation of one or more local area networks. The recommendations are for example sent to the Internet access provider of the local area network and/or to the users of the local area network.

For example, the corrective action generation module 14 identifies the one or more local area networks for which the total criticality score is greater than or equal to a predetermined threshold, for example equal to 0.4.

The corrective actions may be generated by analysing the health score and/or the total criticality score for the local area network and/or by analysing the health score and/or the total criticality score for one or more elements of the local area network.

The corrective actions represent actions that may be automated on the items of equipment in question. The incident detection device 10 thus identifies, on the basis of the total criticality scores, for example at the end of a day, the items of equipment requiring optimizations and/or changes of configuration.

The corrective action generation module 14, having identified the one or more networks whose total criticality score and/or health score is greater than or equal to the predetermined threshold, generates corrective actions by analysing the severity scores stored over the day. The list of corrective actions is sent to these items of equipment using for example the HTTP (Hypertext Transfer Protocol) or MQTT (Message Queuing Telemetry Transport) protocol.

If a coverage incident is detected, for example, by analysing the health score and/or the total criticality score for the local area network and/or by analysing the health score and/or the total criticality score for one or more elements of the local area network and by analysing the severity scores relating to the "low received signal power level" (RSSI<−77 dBm) anomalies, the corrective action generation module 14 sends the Internet access provider of the local area network and/or the users of the local area network a message suggesting to add a new node (or access point) to the local area network in order to improve the overall coverage of the local area network.

For example, if a problem with incorrect positioning of a node is detected, for example by analysing the severity scores relating to the node change or channel change, the corrective action generation module 14 sends the Internet access provider of the local area network and/or the users of the local area network a message suggesting to move a node, for example a repeater node of an Internet gateway of the local area network.

If a frequent channel change at a node incident is detected, for example, by analysing the health score and/or the total criticality score for the local area network and/or by analysing the health score and/or the total criticality score for one or more elements of the local area network and by analysing the severity scores relating to the "frequent channel changes" anomalies, the corrective action generation module 14 sends the Internet access provider of the local area network and/or the users of the local area network a message suggesting that the users and/or nodes set the channel to be used and/or modify the local algorithm thresholds that cause channel changes.

For example, if a noise problem is detected, for example by analysing the severity scores relating to the noise level, the corrective action generation module 14 sends the Internet access provider of the local area network and/or the users of the local area network a message suggesting to move or even remove noise sources and/or, as a corrective action, a message telling a node to change frequency band.

If a noise incident is detected, for example, by analysing the health score and/or the total criticality score for the local area network and/or by analysing the health score and/or the total criticality score for one or more elements of the local area network and by analysing the severity scores relating to the "very high noise level around a node or stations" anomalies, the corrective action generation module 14 sends the Internet access provider of the local area network and/or the users of the local area network a message suggesting that the users and/or nodes switch to another channel and/or Wi-Fi band where the noise level is lower.

For example, if a non-standard Wi-Fi configuration incident is detected, for example, by analysing the health score and/or the total criticality score for the local area network and/or by analysing the health score and/or the total criticality score for one or more elements of the local area network and by analysing the severity scores relating to the "outdated standards used" anomalies, the corrective action generation module 14 sends the Internet access provider of the local area network and/or the users of the local area network a message suggesting that the users and/or nodes restore the default Wi-Fi configuration.

Figure 2:
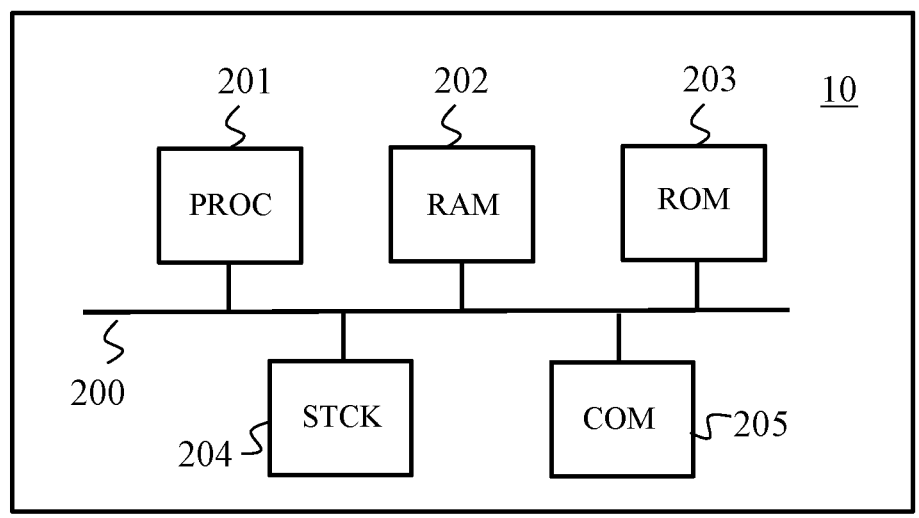
FIG. 2 schematically illustrates an exemplary hardware architecture of a device for detecting incidents in at least one local area network.

FIG. 2 schematically illustrates an exemplary hardware architecture of a device for detecting incidents in at least one local area network.

According to the exemplary hardware architecture shown in FIG. 2, the incident detection device 10 comprises the following, connected by a communication bus 200: a processor or CPU (central processing unit) 201; a random access memory RAM 202; a read-only memory ROM 203; a storage unit such as a hard disk (or storage medium reader, such as an SD (secure digital) card reader) 204; at least one communication interface 505 allowing the incident detection device 10 to communicate via the wide area network 20.

The processor 201 is capable of executing instructions loaded into the RAM 202 from the ROM 203, from an external memory (not shown), from a storage medium (such as an SD card) or from a communication network. When the incident detection device 10 is powered on, the processor 201 is capable of reading instructions from the RAM 202 and executing them. These instructions form a computer program that causes the processor 201 to implement all of part of the method described with reference to FIG. 5.

The method described below with reference to FIG. 5 may be implemented in software form by executing a set of instructions by way of a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the incident detection device 10 comprises electronic circuitry configured so as to implement the method described with reference to FIG. 5.

It should be noted here that FIG. 2 shows a hardware architecture of a single incident detection device 10. The various elements forming the incident detection device 10 may be distributed among various computing devices contained in the computing cloud.

Figure 5:
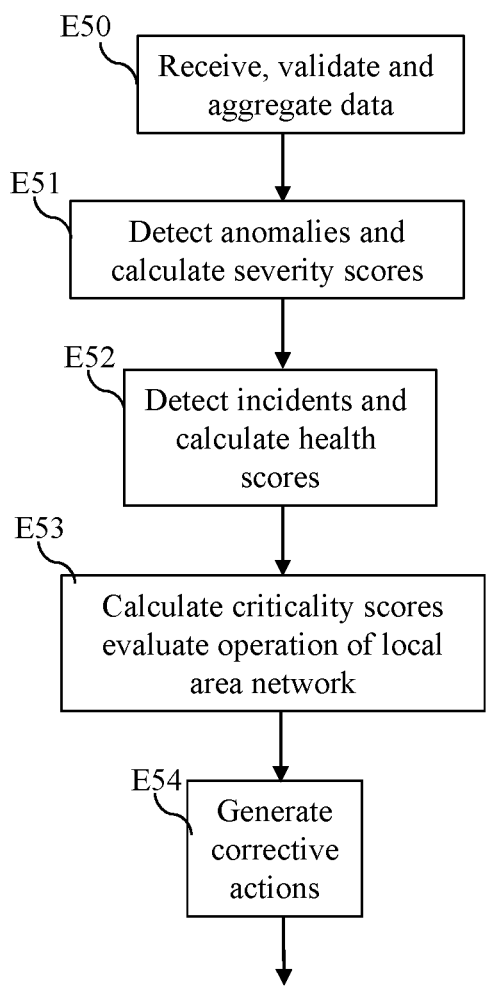
FIG. 5 schematically illustrates an incident detection method according to the present invention.

FIG. 5 schematically illustrates an incident detection method according to the present invention.

In step E50, the incident detection device 10 receives, validates and aggregates each message received from a collection agent 41.

The incident detection device 10 validates the content of each received message, for example by checking whether the format of the received message is consistent, whether the values of the information contained in the received message are within a consistent value range, and whether the local area network from which the message originated forms part of the set of local area networks managed by the incident detection device 10.

In the affirmative, the incident detection device 10 aggregates the data describing the connections between the stations and the nodes and the data describing the connections between the nodes into groups of data.

For example, the data are partitioned with a predetermined periodicity, for example equal to 10 minutes.

If, within a partition, no change of operating feature of a link occurs, a group of data is formed, the group of data comprising all of the data of the partition.

Within each partition, upon each change of at least one operating feature of a link, a group of data is formed, which comprises the data of the partition corresponding to the frequency band, to the channel and to the communication protocol.

An operating feature of a link is for example, and without limitation, the frequency band, the channel and the communication protocol, such as for example the Wi-Fi protocol.

In step E51, the incident detection device 10 detects anomalies for each group by calculating the score bounded between 0 and 1, called severity for the various metrics.

The severity score makes it possible to evaluate the difference between these metrics and predetermined values representative of normal operation or behaviour.

A severity score of 0 signifies that there is no anomaly, and a severity score of 1 signifies significant interference on the Wi-Fi link for the group.

The incident detection device 10 thus calculates, for each group of data, a severity score for each type of anomaly.

The incident detection device 10 also calculates severity scores for one or more elements of the local area network considering only the data relating to the element of the local area network.

The incident detection device 10 calculates, for each group of data, a total severity score on the basis of the severity scores calculated for the group of data.

This total severity score is also between 0 and 1, increases with the other severity scores, and is equal to one as soon as one of the severity scores is equal to one.

The incident detection device 10 also calculates total severity scores for one or more elements of the local area network considering only the data relating to the element of the local area network.

Each severity score and total severity score is stored in a database 13.

In step E52, the incident detection device 10 calculates at least one indicator of the health of the local area network and/or calculates a health score respectively for one or more elements over a day. An element is for example and without limitation a node, a link, etc. The aim of the health indicator is to construct a bounded score in order to be able to compare various local area networks and/or various elements or various time ranges without scale considerations: the health of a large network does not have to be penalized by its size; it is normal to find more anomalies there than in a small network.

The incident detection device 10 advantageously uses the total severity score for a group to calculate an indicator representative of the health of an element, taking the 1's complement of the total severity score. For a set of groups, the incident detection device 10 calculates the average of the health scores weighted by the duration of the groups.

A health score may be assigned to any set of groups of data: a local area network over a day. This health score is bounded between 0 and 1, and may therefore be transformed to any health indicator scale (for example percentage, index between 1 and 5, etc.).

The health score is calculated using the following formula:

$$H = 1 - \frac{\sum_{liens} t_i \times s'_i}{\sum_{liens} t_i}$$

where $t_i$ is the connection duration of the group i and $s'_i$ is the total severity score for the group of data.

The incident detection device 10 also calculates health scores for one or more elements of the local area network considering only the total severity scores relating to the element of the local area network.

The health score makes it possible to visually represent/summarize the health level of a local area network and to be able to compare it with other local area networks. It is for example used by the operator responsible for analysing performance and the health level of local area networks on the scale of a fleet of subscribers.

The health scores calculated for elements of the local area network make it possible to visually represent/summarize the health level of an element of the local area network and to be able to compare it with other elements of the local area network and/or with elements of other local area networks.

In step E53, the incident detection device 10 calculates criticality scores.

The incident detection device 10 performs daily analysis in order to detect incidents on the local area network and to offer appropriate recommendations.

An incident, in contrast to anomalies, takes place on the scale of a day. Depending on the type of incident, this may concern a station, for example linked to the station using an outdated standard, a Wi-Fi link, for example incorrect packet transmission, or an access point, for example a high noise level.

Each type of incident is linked to a type of anomaly. To determine whether there is an incident, the incident detection and criticality score calculation module 16 calculates, for all of the groups in question, the connection duration weighted by the associated total severity. This criticality score, which is expressed in seconds, is called total criticality score:

$$c = \sum_{groupes} t_i \times s'_i$$

where $t_i$ is the connection duration of the group i, $s'_i$ is the total severity score for the anomaly and the summing is performed on all of the groups of data affected by the incident.

An incident thus makes it possible to see whether the criticality linked to an anomaly is problematic over a day: this incident is spread out over time with a non-zero severity. It is considered that there is effectively an incident if the calculated criticality score exceeds a reference duration, for example 600 seconds, that is to say 10 minutes of anomaly with maximum severity.

The total criticality is the preferred metric for measuring the impact of an incident on the local area network. The most serious incidents are those that impact the most links of the local area network for the longest time to the severest extent. It is sometimes beneficial to consider the incidence time instead, that is to say the cumulative duration of all of the groups affected by the incident. By construction, the total criticality 402 is less than or equal to the incidence time 401, which is itself less than the total connection time over the day 400, as illustrated in FIG. 4.

For example, if the total criticality score is greater than 40% of the total duration of the connections, corrective actions may be performed depending on the type of incident.

If the user has been impacted for more than 4 hours out of a total of 10 hours of connections, the incident is for example considered to be relatively serious, and corrective actions may be performed.

The incident detection and criticality score calculation module 16 also calculates total criticality scores for one or more elements of the local area network considering only the total severity scores relating to the element of the local area network.

In step E54, the incident detection device 10 generates recommendations or corrective actions for improving the operation of one or more local area networks. The recommendations are for example sent to the Internet access provider of the local area network and/or to the users of the local area network.

For example, the incident detection device 10 identifies the one or more local area networks for which the total criticality score is greater than or equal to a predetermined threshold, for example equal to 0.4.

The corrective actions may be generated by analysing the health score and/or the total criticality score for the local area network and/or by analysing the health score and/or the total criticality score for one or more elements of the local area network.

The corrective actions represent actions that may be automated on the items of equipment in question. The incident detection device 10 thus identifies, on the basis of the total criticality scores, for example at the end of a day, the items of equipment requiring optimizations and/or changes of configuration.

The incident detection device 10, having identified the one or more networks whose total criticality score and/or health score is greater than or equal to the predetermined threshold, generates corrective actions by analysing the severity scores stored over the day.

The list of corrective actions is sent to these items of equipment using for example the HTTP (Hypertext Transfer Protocol) or MQTT (Message Queuing Telemetry Transport) protocol. For example, if a coverage problem is detected, for example by analysing the severity scores relating to the node change or channel change level, the incident detection device 10 sends the Internet access provider of the local area network and/or the users of the local area network a message suggesting to move a station closer to a node or to add a node to the local area network.

If a coverage incident is detected, for example, by analysing the health score and/or the total criticality score for the local area network and/or by analysing the health score and/or the total criticality score for one or more elements of the local area network and by analysing the severity scores relating to the "low received signal power level" (RSSI<−77 dBm) anomalies, the incident detection device 10 sends the Internet access provider of the local area network and/or the users of the local area network a message suggesting to add a new node (or access point) to the local area network in order to improve the overall coverage of the local area network.

For example, if a problem with incorrect positioning of a node is detected, for example by analysing the severity scores relating to the node change or channel change, the incident detection device 10 sends the Internet access provider of the local area network and/or the users of the local area network a message suggesting to move a node, for example a repeater node of an Internet gateway of the local area network.

If a frequent channel change at a node incident is detected, for example, by analysing the health score and/or the total criticality score for the local area network and/or by analysing the health score and/or the total criticality score for one or more elements of the local area network and by analysing the severity scores relating to the "frequent channel changes" anomalies, the incident detection device 10 sends the Internet access provider of the local area network and/or the users of the local area network a message suggesting that the users and/or nodes set the channel to be used and/or modify the local algorithm thresholds that cause channel changes.

For example, if a noise problem is detected, for example by analysing the severity scores relating to the noise level, the incident detection device 10 sends the Internet access provider of the local area network and/or the users of the local area network a message suggesting to move or even remove noise sources and/or, as a corrective action, a message telling a node to change frequency band.

If a noise incident is detected, for example, by analysing the health score and/or the total criticality score for the local area network and/or by analysing the health score and/or the total criticality score for one or more elements of the local area network and by analysing the severity scores relating to the "very high noise level around a node or stations" anomalies, the incident detection device 10 sends the Internet access provider of the local area network and/or the users of the local area network a message suggesting that the users and/or nodes switch to another channel and/or Wi-Fi band where the noise level is lower.

For example, if a non-standard Wi-Fi configuration incident is detected, for example, by analysing the health score and/or the total criticality score for the local area network and/or by analysing the health score and/or the total criticality score for one or more elements of the local area network and by analysing the severity scores relating to the "outdated standards used" anomalies, the incident detection device 10 sends the Internet access provider of the local area network and/or the users of the local area network a message suggesting that the users and/or nodes restore the default Wi-Fi configuration.

The invention claimed is:

1. Method for detecting incidents in a local area network by way of an incident detection device, the incident detection device being connected to the local area network via a wide area network, the local area network comprising a data collection agent collecting data describing the connections between stations and nodes of the local area network and data describing the connections between the nodes, wherein the incident detection device is able to detect various types of anomaly and in that the method comprises the following steps, performed by the incident detection device:
   receiving messages from the collection agent, validating and aggregating the data describing the connections between the stations and the nodes and the data describing the connections between the nodes and contained in each received message into groups of data,
   calculating, for each group of data, a severity score for each type of anomaly and calculating a total severity score for each group of data on the basis of the severity scores calculated for the group of data,
   calculating a total criticality score from all of the total severity scores for the aggregated groups of data during a predetermined duration, the predetermined duration being such that a plurality of groups of data are aggregated during the predetermined duration,
   generating recommendation messages or corrective actions at least on the basis of the total criticality score.

2. Method according to claim 1, wherein the method furthermore comprises a step of calculating the average of the total severity scores weighted by the duration of the groups of data so as to obtain a health score for the local area network.

3. Method according to claim 2, wherein the recommendations or corrective actions are also generated on the basis of the total health score.

4. Method according to claim 1, wherein the local area network consists of elements and in that severity scores, total severity scores, total criticality scores and health scores are calculated for at least some of the elements of the local area network.

5. Method according to claim 4, wherein the recommendations or corrective actions are also generated on the basis of the scores calculated for the at least one portion of the local area network.

6. Method according to claim 1, wherein the data are aggregated by partitioning the data with a predetermined periodicity, if, within a partition, no change of operating feature of a link occurs, a group of data is formed, the group of data comprising all of the data of the partition and, within each partition, upon each change of at least one operating feature of a link, a group of data is formed, which comprises the data of the partition corresponding to the operating feature of the link.

7. Method according to claim 6, wherein the operating feature of the link is a frequency band, a channel or a communication protocol.

8. Method according to claim 1, wherein the value of the severity score is bounded by the value 0 and the value 1.

9. Method according to claim 1, wherein each total severity score is bounded by the value 0 and the value 1 and is equal to the value 1 as soon as a severity score is equal to 1.

10. Method according to claim 9, wherein each total criticality score is calculated on the basis of the sum of the total severity scores weighted by the duration of the groups of data.

11. Method according to claim 1, wherein the recommendations are suggestions to move a station closer to a node of the local area network or to add a node to the local area network or to move a node of the local area network or to modify a channel to be used or to modify local algorithm thresholds that cause channel changes or to remove noise sources or to restore a configuration of the communication protocol, and the corrective actions are channel modifications or modifications of local algorithm thresholds that cause channel changes.

12. Device for detecting incidents in a local area network, the incident detection device being connected to the local area network via a wide area network, the local area network comprising a data collection agent collecting data describing the connections between stations and nodes of the local area network and data describing the connections between the nodes, wherein the incident detection device is able to detect various types of anomaly and in that the incident detection device comprises:
   means for receiving messages from the collection agent, validating and aggregating the data describing the connections between the stations and the nodes and the data describing the connections between the nodes and contained in each received message into groups of data,
   means for calculating, for each group of data, a severity score for each type of anomaly and calculating a total severity score for each group of data on the basis of the severity scores calculated for the group of data,
   means for calculating a total criticality score from all of the total severity scores for the aggregated groups of data during a predetermined duration, the predetermined duration being such that a plurality of groups of data are aggregated during the predetermined duration,
   means for generating recommendation messages or corrective actions at least on the basis of the total criticality score.

13. A non-transitory storage medium, that stores a computer program comprising instructions for a node device to implement the method according to claim 1 when said program is executed by a processor of the node device.

* * * * *